(12) United States Patent
Huang (10) Patent No.: US 12,111,753 B2
(45) Date of Patent: Oct. 8, 2024

(54) METHOD, APPARATUS, AND STORAGE MEDIUM FOR GENERATING TEST CASES

(71) Applicant: XEPIC CORPORATION LIMITED, Nanjing (CN)

(72) Inventor: Wu Huang, Shanghai (CN)

(73) Assignee: XEPIC CORPORATION LIMITED, Nanjing (CN)

( * ) Notice: Subject to any disclaimer, the term of this patent is extended or adjusted under 35 U.S.C. 154(b) by 157 days.

(21) Appl. No.: 17/834,105

(22) Filed: Jun. 7, 2022

(65) Prior Publication Data

US 2023/0059703 A1   Feb. 23, 2023

(30) Foreign Application Priority Data

Aug. 18, 2021   (CN) .......................... 202110950787.8

(51) Int. Cl.
*G06F 11/36* (2006.01)
(52) U.S. Cl.
CPC ...... *G06F 11/3684* (2013.01); *G06F 11/3676* (2013.01); *G06F 11/3688* (2013.01); *G06F 11/3692* (2013.01)
(58) Field of Classification Search
CPC ............... G06F 11/369; G06F 11/3688; G06F 11/3676; G06F 11/3684
See application file for complete search history.

(56) References Cited

U.S. PATENT DOCUMENTS

| 7,165,189 | B1* | 1/2007 | Lakkapragada .... G06F 11/2294 714/31 |
| 7,849,425 | B1* | 12/2010 | Hamid ................ G06F 11/3676 716/136 |
| 9,514,036 | B1 | 12/2016 | Dusanapudi et al. |
| 9,665,350 | B1* | 5/2017 | Kalmar ..................... G06F 8/34 |
| 11,709,765 | B1* | 7/2023 | Raja .......................... G06F 8/77 717/102 |
| 2002/0156608 | A1* | 10/2002 | Armbruster ............. G06F 30/33 703/14 |
| 2017/0177765 | A1* | 6/2017 | Dusanapudi ........... G06N 20/00 |
| 2018/0089058 | A1* | 3/2018 | Anantharam ....... G06F 11/3692 |
| 2019/0171553 | A1* | 6/2019 | Chauhan ................ G06N 5/022 |
| 2021/0056015 | A1* | 2/2021 | Recktenwald ...... G06F 11/3688 |

FOREIGN PATENT DOCUMENTS

| CN | 111881051 A | 11/2020 |
| CN | 111930613 A | 11/2020 |
| CN | 113138934 A | 7/2021 |

* cited by examiner

*Primary Examiner* — Phillip H Nguyen
(74) *Attorney, Agent, or Firm* — ANOVA LAW GROUP, PLLC (57) ABSTRACT

A method for generating test cases. The test cases are used to test a plurality of functional units of a logic system design during a simulation process of the logic system design. The method includes acquiring a constraint for generating test cases, and generating a first set of test cases according to the constraint. The first set of test cases is used to cover a part of the plurality of functional units. The method further includes performing a test on the logic system design based on the first set of test cases, determining uncovered functional units that are not covered by the test and a current coverage of the test, and, in response to the current coverage failing to satisfy a preset test coverage condition, generating a second set of test cases according to the uncovered functional units.

19 Claims, 7 Drawing Sheets

METHOD, APPARATUS, AND STORAGE MEDIUM FOR GENERATING TEST CASES

CROSS-REFERENCE TO RELATED APPLICATION

This application claims priority to Chinese Application No. 202110950787.8, filed Aug. 18, 2021, which is incorporated herein by reference in its entirety.

TECHNICAL FIELD

The present disclosure relates to the technical field of logical system design and, more particularly, to a method, an apparatus, and storage medium for generating test cases.

BACKGROUND

In the field of integrated circuit (IC) verification, simulation generally refers to compiling a design and running the compiled design on a computer or a hardware simulation apparatus, so as to simulate and test the various functions of the design. The design can be, for example, a design of an Application Specific Integrated Circuit (ASIC) or a system-on-chip (SOC). Therefore, the design that is tested or verified in the simulation can also be called a Device Under Test (DUT).

While test cases required by a simulation test are being generated, it takes a long time to randomly generate test cases for satisfying the functional coverage requirement of the simulation test.

SUMMARY

In accordance with the disclosure, there is provided a method, an apparatus and storage medium for generating test cases.

A first aspect of the present disclosure provides a method for generating test cases, wherein the test cases are used to test a plurality of functional units of the logic system design during the simulation process of the logic system design. The method comprising: acquiring constraints for generating test cases; generating a first set of test cases according to the constraints, wherein the first set of test cases is used to cover a part of the plurality of functional units; testing the logic system design based on the first set of test cases; determining the uncovered functional units and current coverage of the test; and in response to the current coverage fails to satisfy the preset test coverage condition, generating a second set of test cases according to the uncovered functional units.

A second aspect of the present disclosure provides an apparatus, comprising: a memory for storing a set of instructions; and at least one processor configured to execute the set of instructions to perform the method described in the first aspect.

A third aspect of the present disclosure provides a non-transitory computer-readable storage medium that stores a set of instructions of an apparatus. The set of instructions is used to cause the apparatus to perform the method described in the first aspect.

The method, apparatus and storage medium for generating test cases provided by the present disclosure can control the test cases generated subsequently by adding constraints for generating test cases and modifying the constraints according to the test results, thereby reducing the time and space overhead for generating test cases, and improving the efficiency of the simulation test.

BRIEF DESCRIPTION OF THE DRAWINGS

To describe the technical solutions in the present disclosure more clearly, the following will briefly introduce the figures that need to be used in the embodiments. Obviously, the figures in the following description are merely exemplary, for those ordinary skilled in the art, without inventive work, other figures can be obtained based on these figures.

DETAILED DESCRIPTION

Exemplary embodiments will be described in detail herein, and examples thereof are shown in the accompanying drawings. In the following description involving the accompanying drawings, the same numerals in different accompanying drawings indicate the same or similar elements, unless specified otherwise. Implementations described in the following exemplary embodiments do not represent all implementations consistent with the disclosure. In contrast, they are merely examples of devices and methods consistent with some aspects of the disclosure as described in detail in the appended claims.

Terms in the disclosure are merely used for describing specific embodiments, rather than limiting the disclosure. Singular forms "a (an)", "said", and "the" used in the present disclosure and the appended claims also include plural forms, unless clearly specified in the context that other meanings are denoted. It should be further understood that the term "and/or" used herein refers to and includes any or all possible combinations of one or more associated items listed.

It should be understood that, although terms such as "first", "second", and "third" can be used to describe various kinds of information in the disclosure, these kinds of information should not be limited by the terms. These terms are merely used to distinguish information of the same type from each other. For example, without departing from the scope of the disclosure, the first information can also be referred to as second information, and similarly, the second information can also be referred to as first information. Depending on the context, the word "if" used herein can be interpreted as "when . . . ", "as . . . ", or "in response to the determination".

The simulation test is to check whether the logic system design can achieve the predetermined function by applying various incentives to the logic system design on the host running the simulation test tool.

Figure 1:
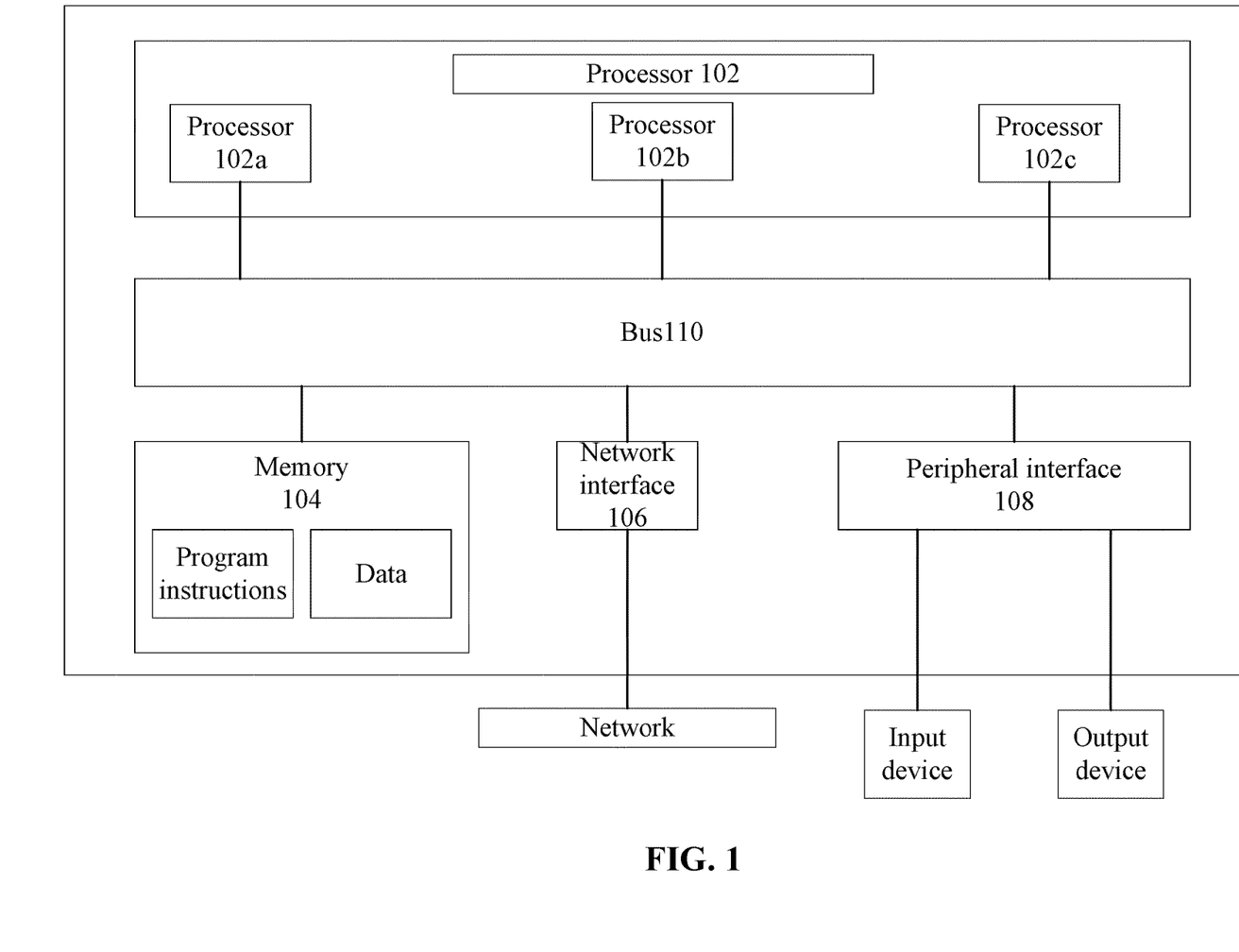
FIG. 1 illustrates a schematic diagram of a host according to embodiments of the present disclosure.

FIG. 1 illustrates a schematic diagram of a host 100 according to embodiments of the present disclosure. The host 100 can be an apparatus for running the simulation tool. As shown in FIG. 1, the host 100 can include: a processor 102, a memory 104, a network interface 106, a peripheral interface 108, and a bus 110. The processor 102, the memory 104, the network interface 106, and the peripheral interface 108 can communicate with each other through the bus 110 in the host.

The processor 102 can be a central processing unit (CPU), an image processor, a neural network processor (NPU), a microcontroller (MCU), a programmable logical device, a digital signal processor (DSP), an application specific integrated circuit (ASIC), or one or more integrated circuits. The processor 102 can perform functions related to the techniques described in the disclosure. In some embodiments, the processor 102 can also include a plurality of processors integrated into a single logical component. As shown in FIG. 1, the processor 102 can include a plurality of processors 102a, 102b, and 102c.

The memory 104 can be configured to store data (e.g., an instruction set, computer codes, intermediate data, etc.). In some embodiments, the simulation test tool used to simulate the test design can be a computer program stored in the memory 104. As shown in FIG. 1, the stored data can include program instructions (e.g., program instructions used to implement the simulation method of the present disclosure) and the data to be processed (e.g., the memory 104 can store temporary codes generated during compiling). The processor 102 can also access stored program instructions and data, and execute the program instructions to operate the data to be processed. The memory 104 can include a non-transitory computer-readable storage medium, such as a volatile storage device or a non-volatile storage device. In some embodiments, the memory 104 can include a random-access memory (RAM), a read-only memory (ROM), an optical disk, a magnetic disk, a hard disk, a solid-state disk (SSD), a flash memory, a memory stick, and the like.

The network interface 106 can be configured to enable the host 100 to communicate with other external devices via a network. The network can be any wired or wireless network capable of transmitting and receiving data. For example, the network can be a wired network, a local wireless network (e.g., a Bluetooth network, a Wi-Fi network, a near field communication (NFC), etc.), a cellular network, the Internet, or a combination of the above. It is appreciated that the type of network is not limited to the above specific examples. In some embodiments, the network interface 106 can include any number of network interface controllers (NICs), radio frequency modules, receivers, modems, routers, gateways, adapters, cellular network chips, or random combinations of two or more of the above.

The peripheral interface 108 can be configured to connect the host 100 to one or more peripheral devices to implement input and output information. For example, the peripheral devices can include input devices, such as keyboards, mice, touch pads, touch screens, microphones, various sensors, and output devices, such as displays, speakers, vibrators, and indicator lights.

The bus 110, such as an internal bus (e.g., a processor-storage bus), an external bus (e.g., a USB port, a PCI-E bus), and the like, can be configured to transmit information among various components of host 100 (e.g., the processor 102, the memory 104, the network interface 106, and the peripheral interface 108).

It should be noted that, although the above host merely illustrates the processor 102, the memory 104, the network interface 106, the peripheral interface 108, and the bus 110, the host architecture can also include other components necessary for normal operations. In addition, it can be appreciated for those ordinary skilled in the art that the foregoing devices can also include the components necessary to implement the solutions of embodiments of the present disclosure and do not require to include all the components of figures.

In the field of logic system design (e.g., a chip design), simulation tools can be used to simulate the design. A simulation tool can be a computer program running on the host 100 shown in FIG. 1.

Figure 2:
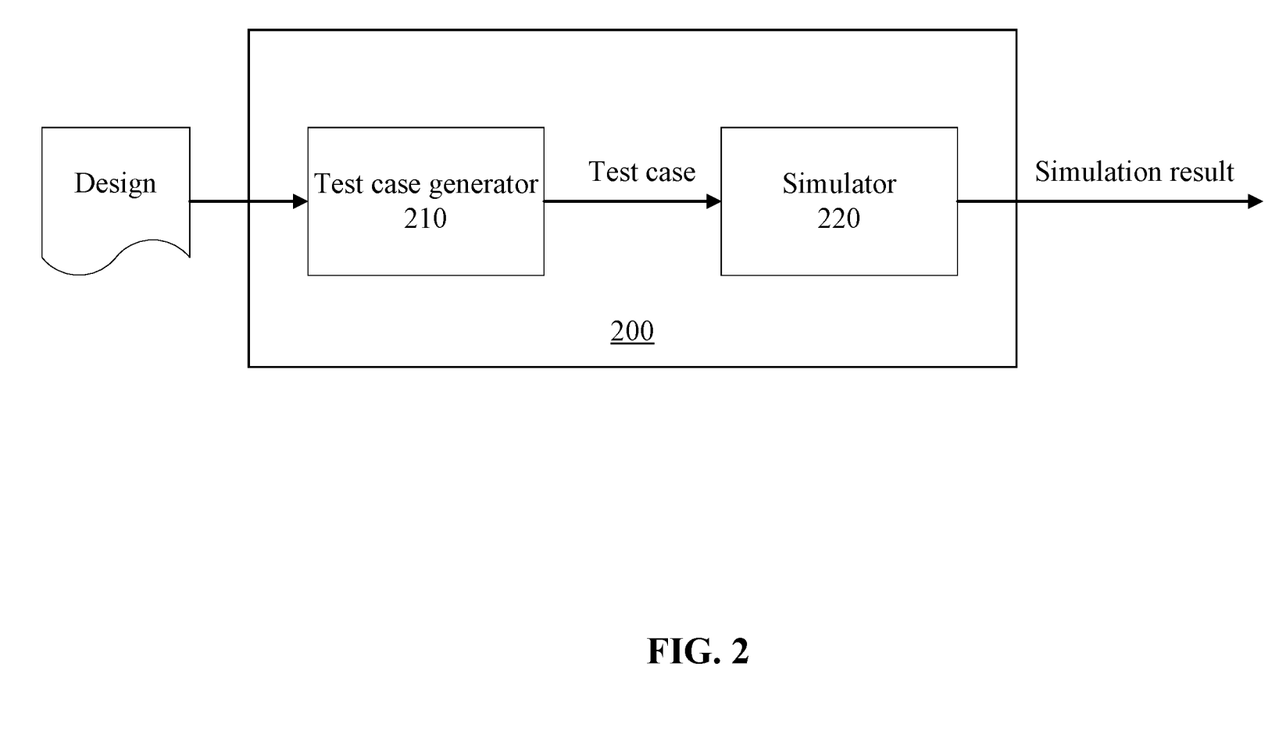
FIG. 2 illustrates a schematic diagram of a simulation test tool according to embodiments of the present disclosure.

FIG. 2 illustrates a schematic diagram of a simulation test tool 200 according to embodiments of the present disclosure. As shown in FIG. 2, the simulation test tool 200 can include a test case generator 210 and a simulator 220.

The test case generator 210 can generate test cases based on the constraint codes. Constraint codes can also be referred to as constraints. Generally, the source language for writing constraints is a high-level programming language. The high-level programming language can be, for example, a software programming language such as C and C++, a domain description language such as a DSL (Domain Specific Language), a hardware description language such as SystemVerilog, and the like. Generally, the test case generator 210 can be stored in the memory 104 shown in FIG. 1 and executed by the processor 102, to generate test cases according to the constraints.

The simulator 220 can perform a simulation test on the logic system design according to the test cases, and output the simulation test results. For example, the simulator 220 can output the simulation test results to an output device (such as a display, etc.) via the peripheral interface 108 shown in FIG. 1, and meanwhile, the simulator 220 can also modify the constraints according to the simulation test results and send the modified constraints to the test case generator 210.

In some embodiments, the design can be a verification environment written in the SystemVerilog language, e.g., a Universal Verification Methodology (UVM) environment. By using the simulation test tool 200 to simulate the design, a UVM environment can be constructed, and a device under test (DUT) can be verified in the UVM environment. The description of the design (e.g., HDL description) can be compiled into a simulation program. The simulation program can be used as a DUT in the UVM environment.

Figure 3:
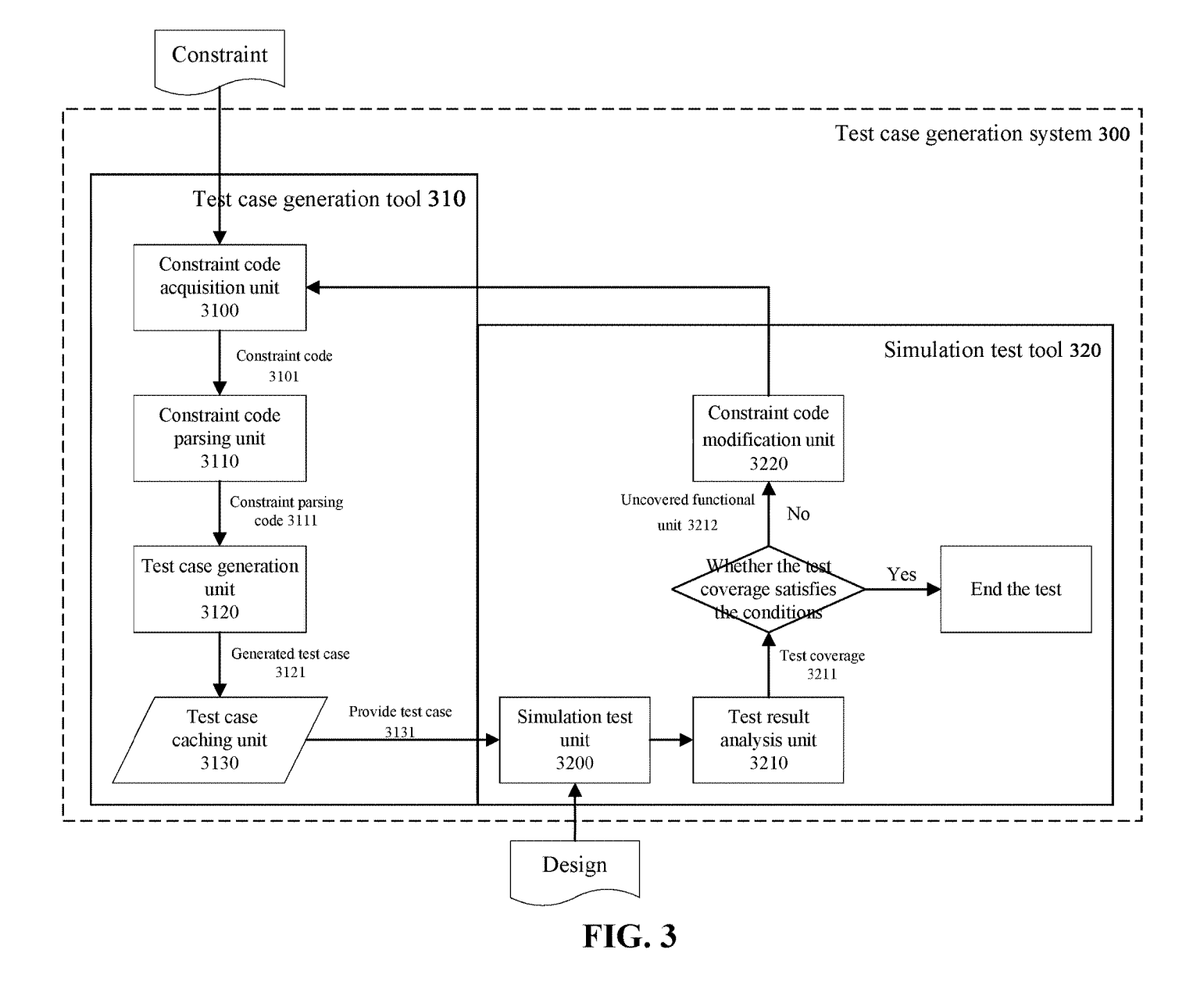
FIG. 3 illustrates a schematic diagram of a test case generation system according to embodiments of the present disclosure.

FIG. 3 illustrates a schematic diagram of a test case generation system 300 according to embodiments of the present disclosure. As shown in FIG. 3, the test case generation system 300 can include a test case generation tool 310 and a simulation test tool 320. The test case generation system 300 can generate a plurality of sets of test cases for testing a plurality of functional units of the logic system design in the simulation of the logic system design. The functional unit of the logic system design can be a functional module of the logic system design (e.g., a communication module, a storage module, a computing module). The functional unit can also be a small functional module within a large functional module (e.g., a general computing module, a neural network computing module, and the like in a computing module) or a part of a functional module (e.g., each address segment of a storage module, etc.). In short, the granularity of the functional units of the logic system design can be specifically set according to the test requirements.

In embodiments of the present disclosure, the test case generation tool 310 can implement the functions of reading constraints and generating test cases, and can further include a constraint code acquisition unit 3100, a constraint code parsing unit 3110, a test case generation unit 3120, and a test case caching unit 3130.

As shown in FIG. 3, the constraint code acquisition unit 3100 can acquire constraints from outside (e.g., a user), and generate corresponding constraint code 3101. The constraint code parsing unit 3110 can parse the constraint code 3101 to generate the constraint parsing code 3111 which is readable by the test case generation unit 3120. The test case generation unit 3120 can generate a test case 3121 according to the constraint parsing code 3111, and send the generated test case 3121 to the test case caching unit 3130. The test case caching unit 3130 can cache the received test case 3121. It is appreciated that, in some embodiments, the test case generation unit 3120 can also send the generated test case 3121 to the simulation test tool 320 directly.

In embodiments of the present disclosure, the simulation test tool 320 can use the test case 3131 provided by the test case caching unit 3130 to perform a simulation test on the logic system design, and output the simulation test results. The simulation test tool 320 can include a simulation test unit 3200, a test result analysis unit 3210, and a constraint code modification unit 3220.

The simulation test unit 3200 can use the test case 3131 to simulate the logic system design, and obtain simulation test results. The simulation test results can include test coverage 3211.

As shown in FIG. 3, the test result analysis unit 3210 can compare the test coverage 3211 in the obtained simulation test results with a preset test coverage threshold. When the test coverage 3211 fails to satisfy the preset test coverage condition, the test result analysis unit 3210 can send the uncovered functional unit 3212 in the simulation test results to the constraint code modification unit 3220 to generate a new constraint code. The preset test coverage condition can be that the test coverage 3211 is higher than the test coverage threshold.

Figure 4:
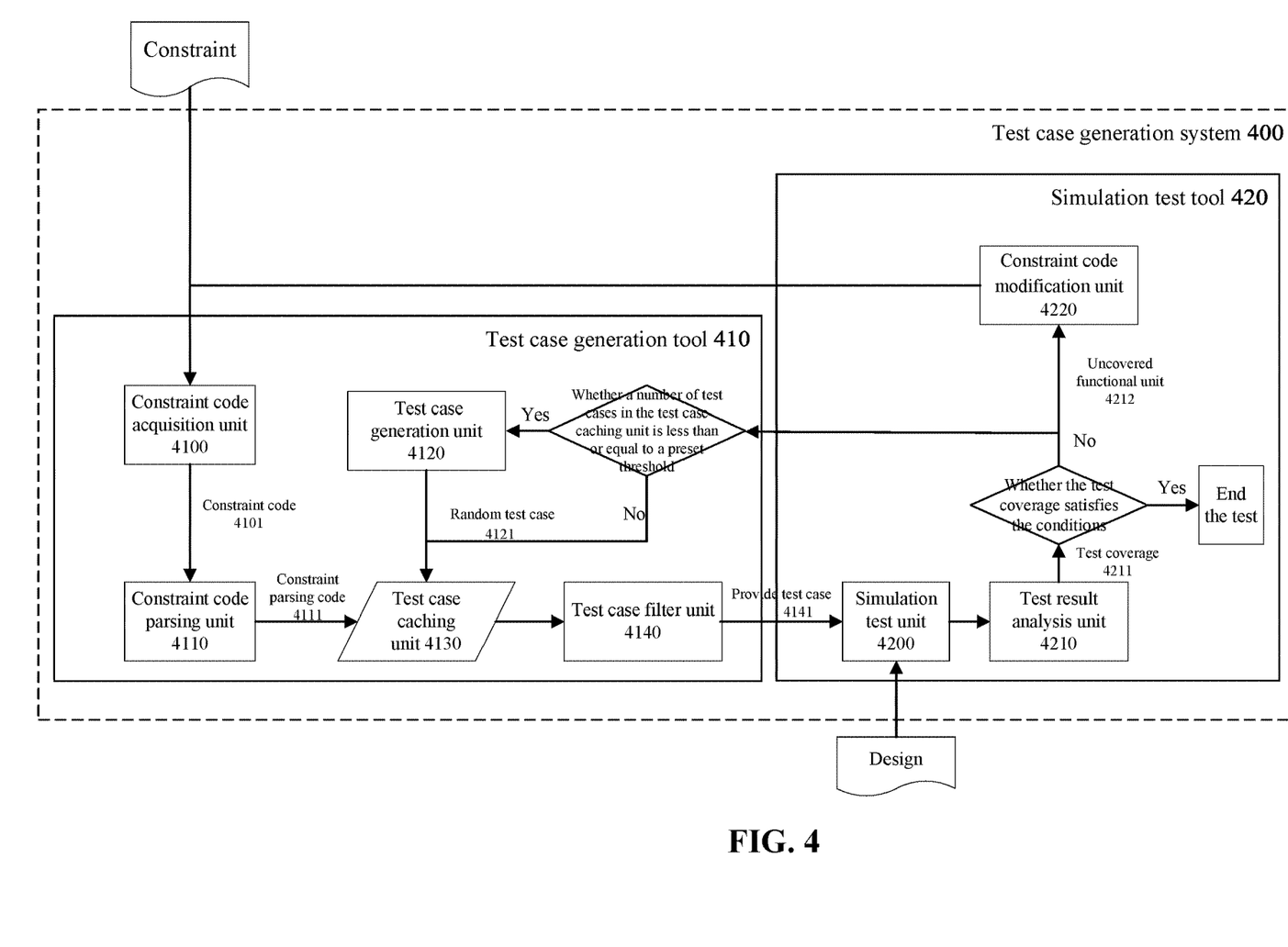
FIG. 4 illustrates a schematic diagram of another test case generation system according to embodiments of the present disclosure.

In some embodiments of the present disclosure, the test case generation unit 3120 in the test case generation tool 310 does not read the constraint parsing code but directly generates random test cases, as shown in FIG. 4. FIG. 4 illustrates a schematic diagram of another test case generation system 400 according to embodiments of the present disclosure, the test case generation system 400 can include a test case generation tool 410 and a simulation test tool 420.

In embodiments of the present disclosure, the test case generation tool 410 can implement functions of reading constraints and generating test cases. As shown in FIG. 4, the constraint code acquisition unit 4100 acquires the constraint input by the user, and generates a constraint code 4101. The constraint code parsing unit 4110 can parse the constraint code 4101 to generate a constraint parsing code 4111 that can be read by the test case filter unit 4140. The test case filter unit 4140 obtains the constraint parsing code 4111, and then reads the test case caching unit 4130 to obtain the test case 4141 to be provided to the simulation test unit.

On the other hand, the test case generation unit 4120 reads the test case caching unit 4130. When a number of test cases in the test case caching unit 4130 is less than or equal to a preset threshold, a new set of random test cases 4121 is generated and sent to the test case caching unit.

In embodiments of the present disclosure, the simulation test unit 4200 of the simulation test tool 420 can use the test case 4141 provided by the test case filter unit 4140 to perform a simulation test on the logic system design, and output the simulation test results. In addition, as shown in FIG. 4, the test result analysis unit 4210 compares the test coverage 4211 in the obtained simulation test results with the preset test coverage threshold. When the test coverage 4211 fails to satisfy the preset test coverage condition, the test result analysis unit 4210 provides the uncovered functional unit 4212 in the simulation test results to the constraint code modification unit 4220, so as to generate new constraint codes. Similarly, the preset test coverage condition can be that the test coverage 4211 is higher than the test coverage threshold.

In some embodiments, the test case generation system 300 or 400 can further acquire a plurality of constraints for generating test cases; generate a plurality of sets of test cases satisfying the preset test coverage conditions based on the plurality of constraints; and train a neural network model based on the plurality of constraints, the logical system design, and the plurality of sets of test cases. Thus, for the logic system design, when the user inputs a new constraint, the trained neural network model can be used to generate a set of test cases quickly. Due to the involvement of the neural network, the set of test cases can achieve higher coverage, thereby improving the convergence speed of test case coverage.

Figure 5:
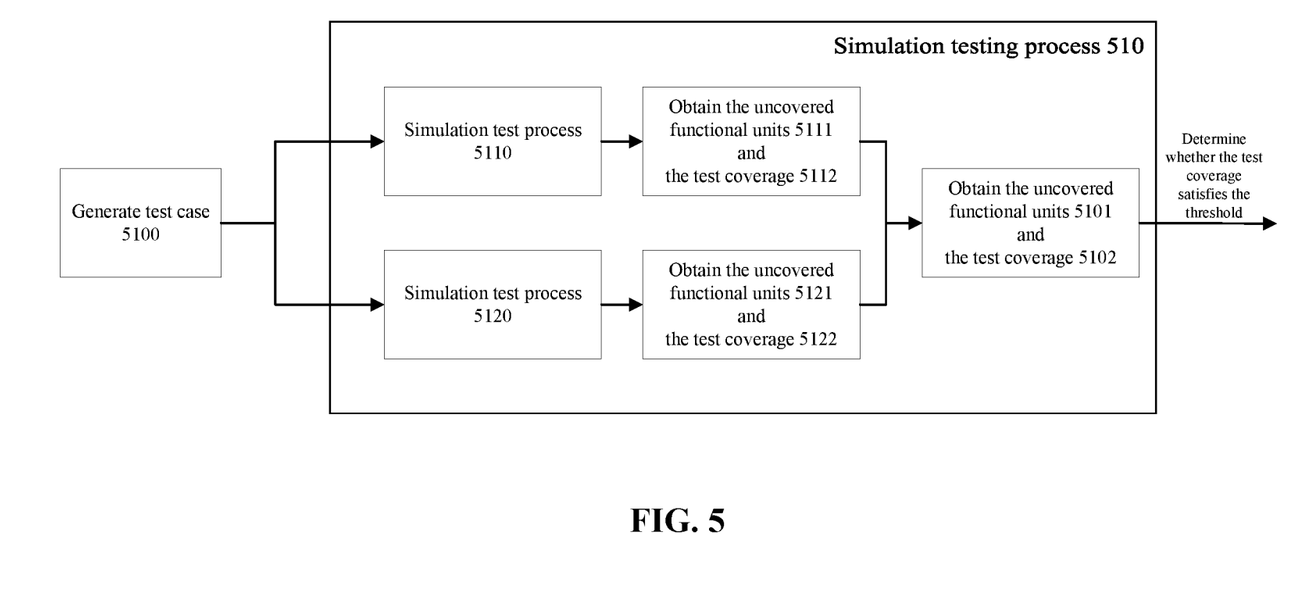
FIG. 5 illustrates a schematic diagram of a simulation test flow according to embodiments of the present disclosure.

FIG. 5 illustrates a schematic diagram of a simulation testing process 510 according to embodiments of the present disclosure. The simulation test can include two or more simulation test processes, each process can generate an independent simulation test result, and the simulation test results generated by all processes can be combined to obtain one simulation test result. The simulation test process can be implemented by the simulation test unit 3200 and the test result analysis unit 3210 as shown in FIG. 3 or the simulation test unit 4200 and the test result analysis unit 4210 as shown in FIG. 4. Referring to FIG. 5, the process 510 can include the following steps.

The simulation test unit 3200 or 4200 receives and generates the test case 5100, generates a simulation test process 5110 and a simulation test process 5120 within the simulation test unit 3200 or 4200, and the two simulation test processes jointly acquire the test case 5100 and perform the test synchronously. The test result analysis unit 3210 or 4210 acquires the test results generated by the two simulation test processes, obtains the uncovered functional units 5111 and the test coverage 5112 generated by the simulation test process 5110, and the uncovered functional units 5121 and the test coverage 5122 generated by the simulation test process 5120, the uncovered functional unit and test coverage generated by the two simulation test processes can be combined to obtain the uncovered functional unit 5101 and the test coverage 5102 contained in the simulation test results.

Embodiments of the present disclosure also provide a method for generating test cases.

Figure 6A:
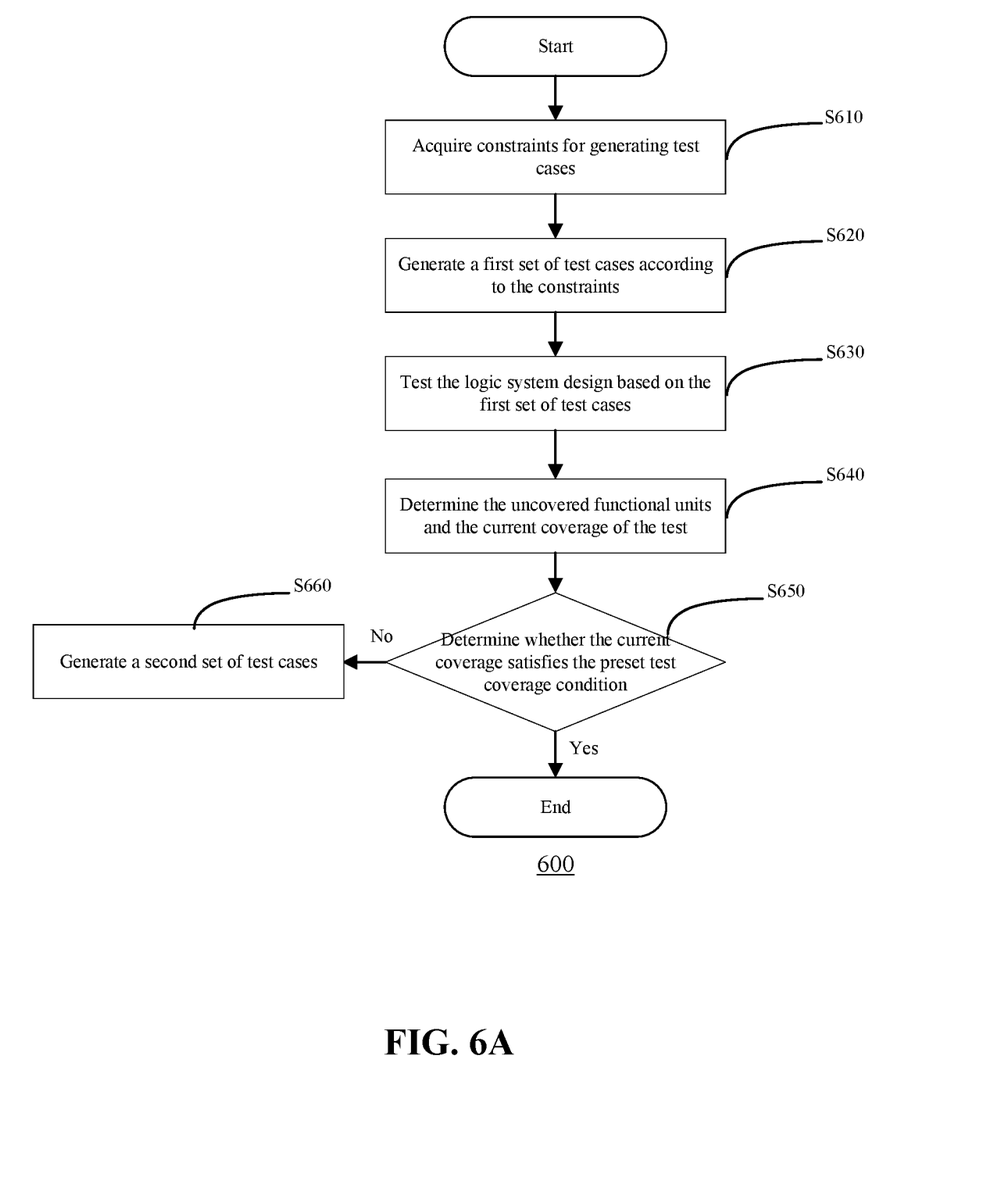
FIG. 6A illustrates a flowchart of a method for generating test cases according to embodiments of the present disclosure.

FIG. 6A illustrates a flowchart of a method 600 for generating test cases according to embodiments of the present disclosure. The test cases are used to test a plurality of functional units of the logic system design during the simulation process of the logic system design. The method can be implemented by the test case generation system 300 or 400 shown in FIGS. 3-4. Referring to FIG. 6, the method 600 can include the following steps.

In step S610, the test case generation system can acquire constraints for generating test cases (e.g., constraint code 3101 as shown in FIG. 3). In some embodiments, to obtain the constraints, the test case generation system can obtain initial constraints for generating test cases, and parse the initial constraints to obtain the constraints.

In step S620, the test case generation system can generate a set of test cases (e.g., test case 3131 in FIG. 3) according to the constraints. The set of test cases is used to cover at least a part of the plurality of functional units.

In some embodiments, the test case generation system can generate test cases (also referred to as "candidate test cases") according to the constraints; and obtain a set of test cases by filtering the test cases (i.e., filtering "the candidate test cases"). It is appreciated that when the constraints are different, different sets of test cases corresponding to the different constraints can be obtained. Here, for the ease of description, the test cases generated according to the first constraint are referred to as the first set of test cases, and the test cases generated according to the second constraint are referred to as a second set of test cases.

In step S630, the test case generation system can test the logic system design based on the first set of test cases.

In step S640, the test case generation system can determine the uncovered functional units and the current coverage of the test.

In step S650, the test case generation system can determine whether the current coverage satisfies the preset test coverage condition. When the current coverage satisfies the preset test coverage condition, the test case generation system completes the test of the logic system design. The preset test coverage condition can be that the current coverage is higher than the given test coverage threshold.

In step S660, in response to the current coverage not satisfying the preset test coverage condition, the test case generation system can generate a second set of test cases according to the uncovered functional units. The test case generation system can further continuously test the logic system design based on the second set of test cases; and update the uncovered functional units and current coverage of the test.

Figure 6B:
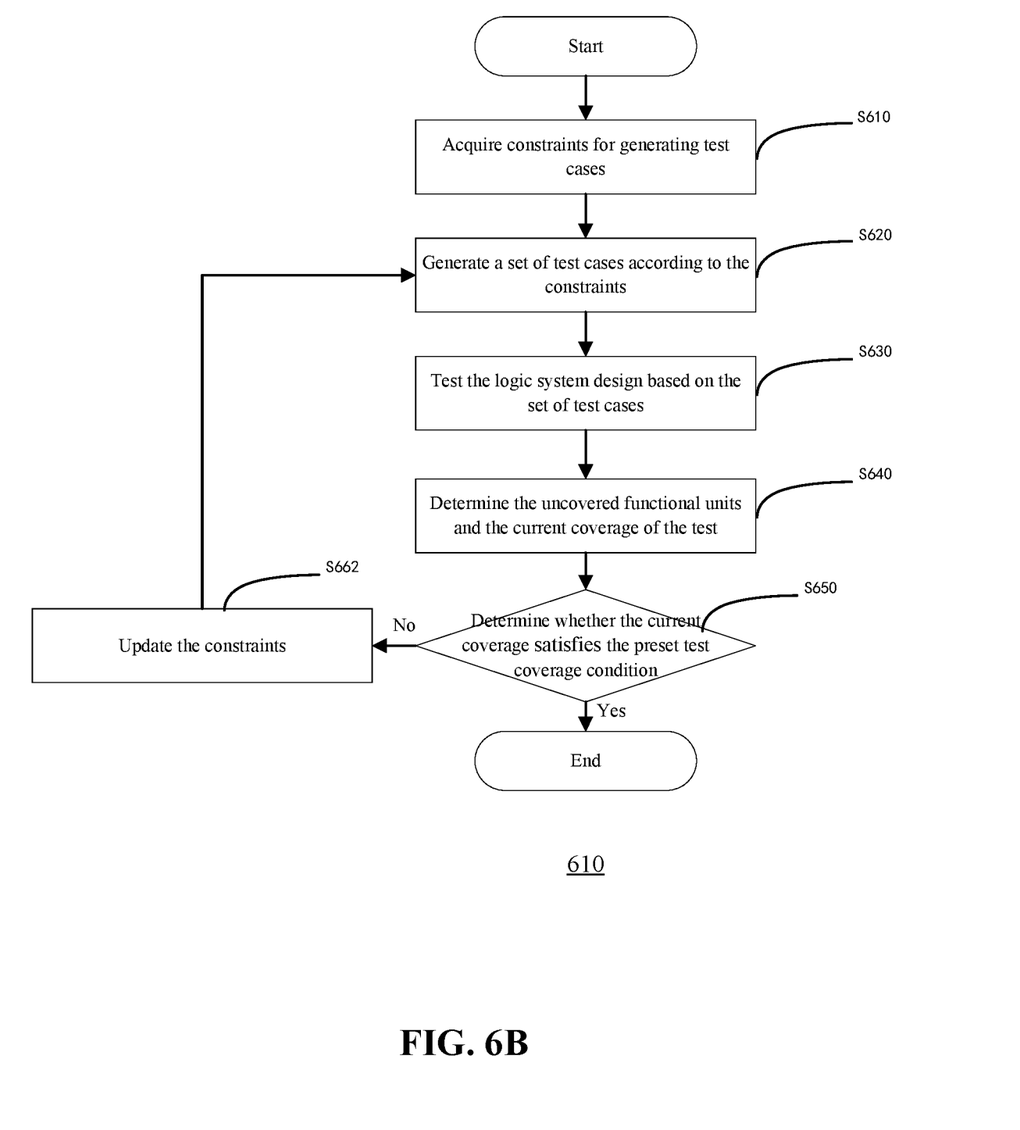
FIG. 6B illustrates a flowchart of another method for generating test cases according to embodiments of the present disclosure.

In some embodiments, the method for generating a second set of test cases can be as shown in FIG. 6B. FIG. 6B illustrates a flowchart of another method 610 for generating test cases according to embodiments of the present disclosure. Compared with the method 600 of FIG. 6A, the method 610 includes the same steps S610-S650, description of which will not be repeated here. Step S660 of the method 600 is implemented in the method of step S662. Details will be described as below. In step S662, the test case generation system can update the constraints according to the uncovered functional units; and generate a second set of test cases according to the updated constraints. As shown in FIG. 6B, after the constraints are updated in step S662, the method 610 can return to step S620 to generate a new set of test cases according to the updated constraints, that is, the second set of test cases.

In some embodiments, the first set of test cases and the second set of test cases cover different functional units. By continuously updating the constraints and generating corresponding test cases, embodiments of the present disclosure can cover all functional units of the logic system design during the testing process of the logic system design quickly, without the problem of repeated testing of the same functional units by a large number of test cases.

In some embodiments, the test case generation system can further acquire a plurality of constraints for generating test cases; generate a plurality of sets of test cases that satisfies the preset test coverage conditions based on the plurality of constraints; and train a neural network model based on the plurality of constraints, the logical system design, and the plurality of sets of test cases. Thus, for the logic system design, when a user inputs a new constraint, the trained neural network model can be used to generate a set of test cases quickly. Due to the involvement of the neural network, the set of test cases can achieve higher coverage, thereby improving the convergence speed of test case coverage. It is appreciated that the constraints for neural network training and the corresponding test cases can also be provided by the user directly.

It should be noted that the method of the present disclosure can be executed by a single device, such as a computer or a server. The method in these embodiments can also be applied in a distributed scenario, and is completed by the cooperation of a plurality of devices. In the case of such a distributed scenario, one device among the plurality of devices can only execute one or more steps in the method of the present disclosure, and the plurality of devices will interact with each other to complete the described method.

Embodiments of the present disclosure further provide a storage medium, where the storage medium stores at least one set of instructions, and when the instructions are executed, the method for generating a test case provided by the embodiments of the present disclosure is executed.

Embodiments of the present disclosure also provide a computer-readable storage medium storing instructions. The instructions, when executed by the apparatus, are used to perform the above-described method. The computer-readable storage media, including persistent and non-permanent, removable and non-removable media, can be implemented by any method or technology for information storage. Information can be computer readable instructions, data structures, modules of programs, or other data. Examples of computer storage media include, but are not limited to, phase-change memory (PRAM), static random access memory (SRAM), dynamic random access memory (DRAM), other types of random access memory (RAM), read only memory (ROM), Electrically Erasable Programmable Read Only Memory (EEPROM), Flash Memory or other memory technology, Compact Disc Read Only Memory (CD-ROM), Digital Versatile Disc (DVD) or other optical storage, Magnetic tape cassettes, magnetic tape magnetic disk storage or other magnetic storage devices or any other non-transmission medium that can be used to store information that can be accessed by a computing device.

Those skilled in the art can easily derive other embodiments of the present application after considering and practicing the above disclosure. The present disclosure is aimed at covering any variations, use or adaptive changes of the present disclosure, and the variations, use or adaptive changes conform to the general principle of the present disclosure and include common knowledge or common technical means in the technical field not disclosed in the present disclosure. The specification and embodiments are merely regarded as exemplary, and the scope and spirit of the present disclosure are defined by the accompanied claims.

It should be understood that the present disclosure is not limited to the accurate structure described above and illustrated in the drawings, and various modifications and changes can be made without departing from the scope thereof. The scope of the invention is only limited by the appended claims.

What is claimed is:

1. A method for generating test cases, wherein the test cases are used to test a plurality of functional units of a logic system design during a simulation process of the logic system design, the method comprising:

acquiring a constraint for generating test cases;
generating a first set of test cases according to the constraint, wherein the first set of test cases is used to cover a part of the plurality of functional units;
performing a test on the logic system design based on the first set of test cases to obtain a test result;
based on the test result, determining uncovered functional units that are not covered by the test and a current coverage of the test; and
after the current coverage of the test is determined based on the test result, in response to the current coverage failing to satisfy a preset test coverage condition, generating a second set of test cases according to the uncovered functional units.

2. The method of claim 1, further comprising:
continuing to test the logic system design based on the second set of test cases; and
updating the uncovered functional units and the current coverage.

3. The method of claim 2, further comprising:
ending the test of the logic system design in response to the current coverage satisfying the preset test coverage condition.

4. The method of claim 1, wherein generating the second set of test cases according to the uncovered functional units comprises:
updating the constraint according to the uncovered functional units to obtain an updated constraint; and
generating the second set of test cases according to the updated constraint.

5. The method of claim 1, wherein generating the first set of test cases according to the constraint comprises:
generating candidate test cases according to the constraint; and
obtaining the first set of test cases by filtering the candidate test cases.

6. The method of claim 1, wherein the preset test coverage condition includes that the current coverage is higher than a given threshold.

7. The method of claim 1, wherein acquiring the constraint for generating test cases comprises:
acquiring an initial constraint for generating test cases; and
parsing the initial constraint to obtain the constraint.

8. The method of claim 1, further comprising:
acquiring a plurality of constraints for generating test cases;
generating, based on the plurality of constraints a plurality of sets of test cases satisfying the preset test coverage condition; and
training a neural network model based on the plurality of constraints, the logical system design, and the plurality of sets of test cases.

9. The method of claim 1, wherein:
acquiring the constraint for generating the test cases comprises acquiring a constraint input by a user and generating the constraint based on the constraint input; and
generating the first set of test cases according to the constraint comprises:
parsing the constraint to generate a constraint parsing code;
reading the constraint parsing code to obtain candidate test cases; and
generating the first set of test cases according to the candidate test cases.

10. The method of claim 9,
wherein the constraint is one of a plurality of constraints including a first constraint and a second constraint, the first constraint being different from the second constraint;
the method further comprising:
generating the candidate test cases according to the plurality of constraints;
wherein
generating the first set of test cases according to the candidate test cases further comprises:
filtering the plurality of candidate test cases to obtain the first set of test cases corresponding to the first constraint; and
generating the second set of test cases comprises:
filtering the plurality of candidate test cases to obtain the second set of test cases corresponding to the second constraint.

11. An apparatus for generating test cases, wherein the test cases are used to test a plurality of functional units of a logic system design during a simulation process of the logic system design, the apparatus comprising:
a memory storing a set of instructions; and
at least one processor, configured to execute the set of instructions to:
acquire a constraint for generating test cases;
generate a first set of test cases according to the constraint, wherein the first set of test cases is used to cover a part of the plurality of functional units;
perform a test on the logic system design based on the first set of test cases to obtain a test result;
based on the test result, determine uncovered functional units that are not covered by the test and a current coverage of the test; and
after the current coverage of the test is determined based on the test result, in response to the current coverage failing to satisfy a preset test coverage condition, generate a second set of test cases according to the uncovered functional units.

12. The apparatus of claim 11, wherein the processor is further configured to execute the set of instructions to:
continue to test the logic system design based on the second set of test cases; and
update the uncovered functional units and the current coverage.

13. The apparatus of claim 12, wherein the processor is further configured to execute the set of instructions to:
end the test of the logic system design in response to the current coverage satisfying the preset test coverage condition.

14. The apparatus of claim 11, wherein the processor is further configured to execute the set of instructions to:
update the constraint according to the uncovered functional units to obtain an updated constraint; and
generate the second set of test cases according to the updated constraint.

15. The apparatus of claim 11, wherein the processor is further configured to execute the set of instructions to:
generate candidate test cases according to the constraint; and
obtain the first set of test cases by filtering the candidate test cases.

16. The apparatus of claim 11, wherein the preset test coverage condition includes that the current coverage is higher than a given threshold.

17. The apparatus of claim 11, wherein the processor is further configured to execute the set of instructions to:
acquire an initial constraint for generating test cases; and
parse the initial constraint to obtain the constraint.

18. The apparatus of claim 11, wherein the processor is further configured to execute the set of instructions to:
acquire a plurality of constraints for generating test cases;
generate, based on the plurality of constraints, a plurality of sets of test cases that satisfy the preset test coverage condition; and
train a neural network model based on the plurality of constraints, the logical system design, and the plurality of sets of test cases.

19. A non-transitory computer-readable storage medium storing a set of instructions that, when executed by a processor, causes the processor to perform a method for generating test cases, wherein the test cases are used to test a plurality of functional units of a logic system design during a simulation process of the logic system design, the method comprising:

acquiring a constraint for generating test cases;

generating a first set of test cases according to the constraint, wherein the first set of test cases is used to cover a part of the plurality of functional units;

generating a first set of test cases according to the constraint, wherein the first set of test cases is used to cover a part of the plurality of functional units;

performing a test on the logic system design based on the first set of test cases to obtain a test result;

based on the test result, determining uncovered functional units that are not covered by the test and a current coverage of the test; and after the current coverage of the test is determined based on the test result, in response to the current coverage failing to satisfy a preset test coverage condition, generating a second set of test cases according to the uncovered functional units.

* * * * *